(12) United States Patent
Mamitsuka et al.

(10) Patent No.: US 6,973,446 B2
(45) Date of Patent: Dec. 6, 2005

(54) KNOWLEDGE FINDING METHOD

(75) Inventors: Hiroshi Mamitsuka, Tokyo (JP); Naoki Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 386 days.

(21) Appl. No.: 09/730,616

(22) Filed: Dec. 6, 2000

(65) Prior Publication Data
US 2001/0003817 A1 Jun. 14, 2001

(30) Foreign Application Priority Data

Dec. 9, 1999 (JP) .................................. 11-350834
Apr. 6, 2000 (JP) ............................. 2000-104760

(51) Int. Cl.[7] ......................... G06F 15/18; G06F 17/30
(52) U.S. Cl. .......................... 706/50; 706/45; 707/100
(58) Field of Search .................................. 706/45–60

(56) References Cited

U.S. PATENT DOCUMENTS 5,704,017 A * 12/1997 Heckerman et al. ........... 706/12
5,832,182 A * 11/1998 Zhang et al. .................. 706/50
5,933,818 A * 8/1999 Kasravi et al. ................ 706/12

OTHER PUBLICATIONS

Naoki Abe, et al., "Query Learning Strategies Using Boosting and Bagging", Proceedigs of the 15th Conference on Machine Learning, Jul. 1998, p. 1–9.

Robert E. Schapire, et al., "Improved Boosting Algorithms Using Confidence-rated Predictions", Proceedings of the Eleventh Annual Conference on Computational Learning Theory, 1998, ACM Press, p. 80-91.

* cited by examiner

*Primary Examiner*—Anthony Knight
*Assistant Examiner*—Michael B. Holmes
(74) *Attorney, Agent, or Firm*—Scully Scott Murphy & Presser

(57) ABSTRACT

A general-purpose knowledge finding method for efficient knowledge finding by selectively sampling only data in large information amounts from a database. Learning means 104 causes a lower-order learning algorithm, inputted via an input unit 107, to perform learning on plural partial samples generated by sampling from data stored in a high-speed main memory 120, to obtain plural hypotheses. Data selection means 105 uses the hypotheses to estimate information amounts of respective candidate data read from a large-capacity data storage device 130, and additionally stores only data in large information amounts into the high-speed main memory 120. A control unit 106 repeats the processing a predetermined number of times, and stores obtained final hypotheses. A prediction unit 102 predicts a label value of unknown-labeled data inputted into the input unit 107 by the final hypotheses, and an output unit 101 outputs the predicted value.

15 Claims, 3 Drawing Sheets

KNOWLEDGE FINDING METHOD

CROSS REFERENCE TO RELATED APPLICATIONS

The present invention claims priority from Japanese Patent Applications No. 11-350834 filed Dec. 9, 1999 and No. 2000-104760 filed Apr. 6, 2000, the contents of which are incorporated herein by reference.

BACKGROUND OF THE INVENTION

1. Field of the Invention

The present invention relates to a knowledge finding method which can be preferably used in data mining to extract useful knowledge from a database stored in a data storage device such as a large capacity disk.

2. Description of Related Art

Conventionally, data mining or knowledge finding method has had a principle object to read useful knowledge by accessing high-volume data, stored in a disk, a possibly small number of times. For example, association rule extraction method is representative of knowledge finding. The method is described in detail in Aggrawal et al., "Mining of ACM SIGMOD Conference on Management of Data, 1993, pp. 207–216.

Further, as a method for selectively sampling data stored in a disk, query and learning by committee is known. The method is described in detail in Seung et al., "Query by Committee", Proceedings of the fifth annual ACM workshop on computational learning theory, 1992, pp. 287–294. According to this method, a random lower-order learning method performs prediction plural times, then only points with the higher inconsistency are selected. This method is based on the premise that the lower-order learning method is a random high-performance learning method.

On the other hand, in the context of enhancing precision of learning method with comparatively-lower performance, a series of techniques to improve learning precision by repeating resampling from given data and integrating obtained plural hypotheses, has attracted attention in recent years. Representative methods of these techniques are bagging and boosting which have been experimentally evaluated as high-performance methods. The bagging is described in Breiman, "Bagging Predictors", Technical Report 421, University of California at Barkley, 1994.

The boosting is described in Freun, Shapire, "A decision-theoretic generalization of on-line learning and an application to boosting", Proceedings of the second European conference on computational learning theory, 1995, pp. 23–37. The method of query and learning by committee has applied to a text classification field or the like for a problem of selecting manually classified and labeled documents or the like. Further, the bagging and boosting techniques have been utilized for the purpose of enhancing the precision of passive learning.

As described above, in the conventional data mining method, in a case where a selective sampling method is used for efficient data mining, the lower-order learning method must be random high-performance learning method. Further, although the precision of learning method with comparatively-low performance can be improved by using the bagging or boosting technique, there is no sampling method which can be performed by using advantages of both techniques.

SUMMARY OF THE INVENTION

The present invention has been made in consideration of the above situation, and has its object to provide a general knowledge finding method for efficiently finding a high-precision label prediction rule, by reading sample candidate data from high-volume data stored in a large capacity data storage device, using a learning method with comparatively-low precision to learn, and selecting data having large information amount from the result of learning and reading the data into a main memory.

According to the first aspect of the present invention, the foregoing object is attained by providing a knowledge finding method in data mining for extracting higher-order knowledge by reading data, sampled from a database stored in a large-capacity data storage device, into a main memory of a calculating machine, comprising: input means for inputting a learning algorithm and data on which the learning algorithm performs learning; learning means for inputting plural partial data sets, generated by sampling from data stored in the main memory, as training data to the learning algorithm, and causing the algorithm to perform learning on the data so as to obtain plural hypotheses; data selection means for predicting function values for plural sample candidate points read from the large-capacity data storage device by using the plural hypotheses obtained by the learning means, estimating information amounts of the candidate points based on obtained predicted values, selecting one or plural candidate points in large information amounts, and additionally storing the selected candidate points into the main memory; control means for repeating processing of selective data storage and knowledge finding by using the learning means and the data selection means until a predetermined stoppage condition is satisfied, and storing resulted plural hypotheses as final hypotheses into the main memory; and prediction means for predicting a label value of unknown-labeled data inputted into the input unit, with an average or weighted average among the plural hypotheses.

It is preferable that the data selection means predicts the function values for the sample candidate points by using the plural hypotheses obtained by the learning means, estimates information amounts of the candidate points by distribution values of obtained predicted values, selects one or plural candidate points with large distribution values, and additionally stores the selected candidate points into the main memory.

It may be arranged such that the data selection means calculates weights of respective hypotheses obtained by the learning means as functions of predicted errors of the hypotheses for the training data, then, upon data selection, in case of multivalue prediction, calculates total sums of the weights of the hypotheses to obtain predicted values, with respect to the respective candidate points, obtains a margin as a difference between the total sum of the greatest weight and that of the next greatest weight, and selects one or plural candidate points with small margins, otherwise, in case of real number prediction, selects one or plural candidate points with large weighted distribution values of the predicted values by the hypotheses, and additionally stores the selected candidate points into the main memory, and the prediction means performs prediction by the final hypotheses, with the weighted average among the hypotheses.

It may be arranged such that the data selection means utilizes true labels of data candidate points included in data read from the large-capacity data storage device to calculate an error margin by using predicted errors of the hypotheses and select one or plural candidate points with small error margins, in case of multivalue prediction, or to select one or plural candidate points with predicted values having large weighted predicted errors, in case of real number prediction, and additionally stores the selected candidate points into the main memory.

It may be arranged such that when the data selection means selects the candidate points and stores them into the main memory, the data selection means obtains predicted values of function values for data already stored in the main memory by using the plural hypotheses, selects one or plural candidate points with predicted values having small distribution and deletes the selected candidate points from the data stored in the main memory.

It may be arranged such that when the data selection means selects the candidate points and stores them into the main memory, the data selection means obtains predicted values of function values for data already stored in the main memory by using the plural hypotheses, then in case of multivalue prediction, selects one or plural candidate points with large margins of predicted values, or in case of real number value prediction, selects one or plural candidate points with predicted values having small weighted distribution values, and deletes the selected candidate points from the data stored in the main memory.

It may be arranged such that when the data selection means selects the candidate points and stores them into the main memory, the data selection means obtains predicted values of functions for the data already stored in the main memory by using the plural hypotheses, then in case of multivalue prediction, selects candidate points with predicted values having large error margins, or in case of real number value prediction, selects one or plural candidate points with predicted values having small weighted predicted errors, and deletes the selected candidate points from the data stored in the main memory.

According to the second aspect of the present invention, the foregoing object is attained by providing a knowledge finding method in data mining for extracting higher-order knowledge by reading data, sampled from a database stored in a large-capacity data storage device, into a main memory of a calculating machine, comprising: input means for inputting a learning algorithm and data on which the learning algorithm performs learning; learning means for inputting data stored in the main memory as training data and performing learning on the data, and storing hypotheses obtained by the learning into the large-capacity data storage device or the main memory; data selection means for predicting function values for plural sample candidate points read from the large-capacity data storage device by using plural past hypotheses obtained by the learning means, estimating information amounts of the candidate points based on obtained predicted values, selecting plural candidate points in large information amounts, and storing the selected candidate points into the main memory; control means for repeating processing of selective data storage and knowledge finding by using the learning means and the data selection means until a predetermined stoppage condition is satisfied, and storing resulted plural hypotheses as final hypotheses into the main memory or the large-capacity data storage device; and prediction means for predicting a label value of unknown-labeled data inputted into the input means, with an average or weighted average among the plural hypotheses.

It is preferable that the data selection means predicts the function values for the sample candidate points by using the plural hypotheses obtained by the learning means, estimates information amounts of the candidate points by distribution values of obtained predicted values, selects one or plural candidate points with large distribution values, and stores the selected candidate points into the main memory.

It may be arranged such that the data selection means calculates weights of the respective hypotheses obtained by the learning means as functions of predicted errors of the hypotheses for the training data, then, upon data selection, in case of multivalue prediction, calculates total sums of the weights of the hypotheses to obtain predicted values, with respect to the respective candidate points, obtains a margin as a difference between the total sum of the greatest weight and that of the next greatest weight, and selects one or plural candidate points with small margins, otherwise, in case of real number prediction, selects one or plural candidate points with large weighted distribution values of the predicted values by the hypotheses, and stores the selected candidate points into the main memory, and the prediction means performs prediction by the final hypotheses, with the weighted average among the hypotheses.

It may be arranged such that the data selection means utilizes true labels of data candidate points included in data read from the large-capacity data storage device to calculate an error margin by using predicted errors of the hypotheses and select one or plural candidate points with small error margins, in case of multivalue prediction, or to select one or plural candidate points with predicted values having large weighted predicted errors, in case of real number prediction, and stores the selected candidate points into the main memory.

According to the third aspect of the present invention, the foregoing object is attained by providing a knowledge finding method in data mining for extracting higher-order knowledge by reading data, sampled from a database stored in a large-capacity data storage device, into a main memory of a calculating machine, comprising: input means for inputting a learning algorithm and data on which the learning algorithm performs learning; learning means for inputting plural partial data sets, generated by sampling from data stored in the main memory, as training data to the learning algorithm, and causing the algorithm to perform learning on the data so as to obtain plural hypotheses; data selection means for predicting function values for plural sample candidate points read from the large-capacity data storage device by using plural past hypotheses obtained by the learning means, estimating information amounts of the candidate points based on obtained predicted values, selecting plural candidate points in large information amounts, and storing the selected candidate points into the main memory; control means for repeating processing of selective data storage and knowledge finding by using the learning means and the data selection means until a predetermined stoppage condition is satisfied, and storing resulted plural hypotheses as final hypotheses into the main memory or the large-capacity data storage device; and prediction means for predicting a label value of unknown-labeled data inputted into the input unit, with an average or weighted average among the plural hypotheses.

It is preferable that the data selection means predicts the function values for the sample candidate points by using the plural hypotheses obtained by the learning means, estimates information amounts of the candidate points by distribution values of obtained predicted values, selects one or plural candidate points with large distribution values, and stores the selected candidate points into the main memory.

It may be arranged such that the data selection means calculates weights of the respective hypotheses obtained by the learning means as functions of predicted errors of the hypotheses for the training data obtained by the learning means, then, upon data selection, in case of multivalue prediction, calculates total sums of the weights of the hypotheses to obtain predicted values, with respect to the respective candidate points, obtains a margin as a difference between the total sum of the greatest weight and that of the next greatest weight, and selects one or plural candidate points with small margins, otherwise, in case of real number prediction, selects one or plural candidate points with large weighted distribution values of the predicted values by the hypotheses, and stores the selected candidate points into the main memory, and the prediction means performs prediction by the final hypotheses, with the weighted average among the hypotheses.

It may be arranged such that the data selection means utilizes true labels of data candidate points included in data read from the large-capacity data storage device, to calculate an error margin by using predicted errors of the hypotheses and select one or plural candidate points with small error margins, in case of multivalue prediction, or to select one or plural candidate points with predicted values having large weighted predicted errors, in case of real number prediction, and stores the selected candidate points into the main memory.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Figure 1:
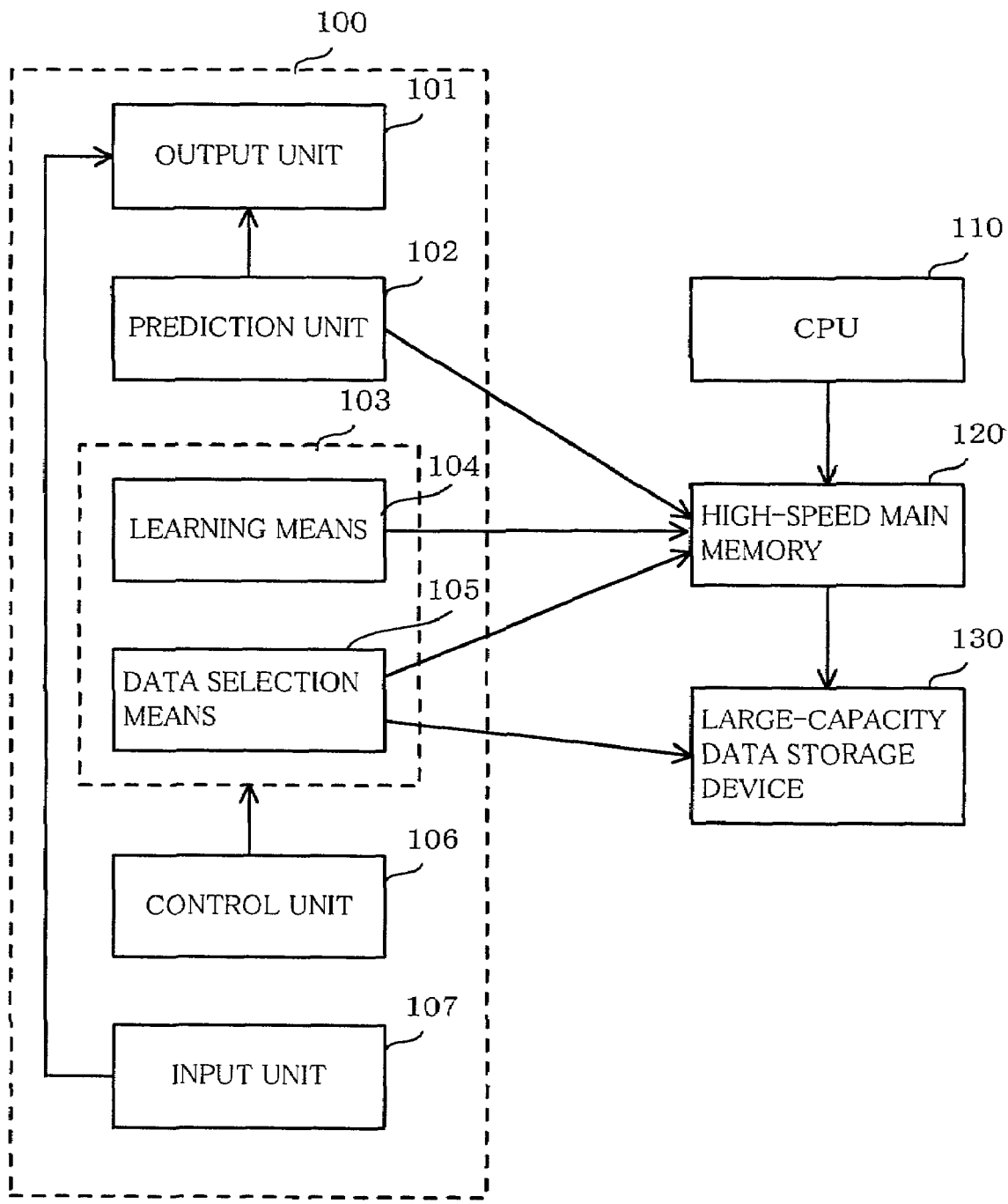
FIG. 1 illustrates the construction of an embodiment of the present invention.

Preferred embodiment of the present invention will now be described in detail in accordance with the accompanying drawings.

First, the basic conception of the present invention will be described. The algorithm of the invention includes a lower-order learning algorithm given as input and an higher-order algorithm for finding knowledge while performing selective sampling by using the lower-order learning algorithm. The function of the lower-order learning algorithm is to perform learning from input data S and output hypotheses and to output predicted values of a label y with regard to one data point x (a set of attribute values) by using the hypotheses obtained by the learning. The learning algorithm does not necessarily have a high-level learning performance. A determination-tree learning algorithm, a learning algorithm of hierarchical neural network or the like can be employed.

The labeled learning data S is expressed by:

$$S=<(x_1, y_1), \ldots, (x_m, y_m)> \quad (1)$$

Note that m is the number of data; xi, a set of attribute values of predesignated attribute of one record on the data; and yi, a pre-designated label of the same record.

Next, the higher-order algorithm will be described. The number of repetition of procedure of selectively storing part of data from a large-capacity data storage device into a memory, resampling and learning (the number of stages) is N; the number of resamplings in each stage, T; the number of candidate points upon selection of data point to be stored in the main memory, R; and the number of points actually stored in the main memory, Q. The higher-order algorithm repeats the following procedures 1 to 3 N times. Otherwise, the procedures 1 and 3 are replaced with procedures 1' and 3'.

Procedure 1: the lower-order learning algorithm is run with respect to a set of plural data $S_1, \ldots, S_T$ obtained by resampling from data stored in the main memory, to obtain hypotheses $H_1, \ldots, H_T$. The resampling from the data $S=<(x_1,y_1), \ldots, (x_m,y_m)>$ means repeating resampling by uniform distribution from the data S (i.e., reading each data with 1/m probability from the data S) a predetermined number of times. Further, the hypothesis means representation to define a predicted value of a label of arbitrary set of attribute values.

Procedure 1': with respect to the data S stored in the main memory, a lower-order algorithm A is run to obtain a hypothesis H.

Procedure 2: R candidate sample points $X_1, \ldots, X_R$ are read from the large-capacity data storage device into the main memory, then Q sample points with large information amount are selected and stored into the main memory. The other points are deleted from the main memory. Upon selection of sample points in large information amounts, labels of respective candidate points are predicted by T hypotheses obtained by the above procedure 1, and Q points with large distribution of predicted values are selected.

Procedure 3: the data obtained by the procedure 2 is added to the past data.

Procedure 3': the past data is replaced by the data obtained by the procedure 2.

Note that the resampling procedure may be performed by using sequentially-changing distribution. For example, in use of the boosting method as a precision enhancing method, resampling is performed while the data distribution which causes error in predicted values of hypotheses from immediately previous partial sampling is sequentially changed. In this case, weights of the respective hypotheses are calculated as predicted error functions of the hypotheses for input training data, and with weighted average of these weights, prediction by the final hypotheses is performed. These weights are also used in estimation of information amount upon data selection. For example, in a case where knowledge representation to be found is a multivalue function, with respect to respective candidate data, the total sums of the weights of hypotheses to predict respective predicted values are calculated, and the information amount is measured by using the difference between the greatest weight total sum and the next greatest weight total sum (hereinbelow, the amount will be referred to as a "margin").

The above procedure will be described in detail. The margin M(x) for a data point x, is defined as follows:

$$M(x)=\Sigma_{Hi(x)=ymax}w_i - max_{Y \neq ymax}\Sigma_{Hi(x)=y}w_i \quad (2)$$

Note that $H_i(x)$ is a predicted value with respect to data point x by hypothesis $H_i$; $w_1$, weight applied to the hypothesis $H_i$; and $y_{max}$, a predicted value with the maximum weight total sum.

That is, $$Y_{max}=arg\ max_y \Sigma_{Hi(x)=y}w_i \quad (3)$$

In this case, a point with the minimum margin is estimated as a point in largest information amount. Note that even in a case where the weights of respective hypotheses are not introduced, as the concept of margin can be expanded by setting the weights of the respective hypotheses to "1", a margin minimum point can be selected as a point in largest information amount by the above procedure.

In a case where knowledge representation is a real number function, the information amount of each candidate data can be measured by using a weighted average value of distribution value of predicted value. The weighted average $V(x)$ of distribution value is expressed by:

$$V(x)=\Sigma_{i=1,\ldots,T}w_i|H_i(x)-\overline{H_i(x)}| \quad (4)$$

Note that $\overline{H_i(x)}$ is an average value of label predicted value for x. The larger the weighted average value of distribution value is, the larger the information amount of candidate data is.

The calculation of information amount by distribution value of predicted values and margin value of each hypothesis is as described above, however, prediction errors of hypotheses, which can be calculated by using correct label values for respective data points, may be utilized. For example, in a case where knowledge representation to be found is a multivalue function, the definition of the margin in the expression (2) is corrected to definition of error margin M'(x) expressed as follows, and a data point of the minimum error margin can be a point in the largest information amount.

$$M'(x)=\Sigma_{i=1,\ldots,T}w_i max_{y=y^*}\Sigma_{Hi(x)=y}w_i \quad (5)$$

Note that y* represents a true label value of data x.

Further, in a case where knowledge representation to be found is a real number function, the information amount can be calculated as a weighted average value V'(x) of prediction error for data point x of each hypothesis. For example, if a square error is used, the value V'(x) is calculated from:

$$V'(x)=\Sigma_{i=1,\ldots,T}w_i|H_i(x)-y^*| \quad (6)$$

According to the above definitions, the value M'(x) can be obtained by replacing the predicted value mode in the definition of M(x) with a true label value, and the value V'(x), by replacing the predicted average value in the definition of V(x) with a true value. Generally, any other error than the square error, i.e., an absolute error may be employed.

Further, in the above higher-order algorithm, in a case where data storage by repeated selection exceeds the limited capacity of the main memory, or a part of data repeatedly selected and stored in the main memory becomes unnecessary for learning, or it is impossible to learn these data due to much calculation time, the above error margin and the value V'(x) can be utilized to delete the data in the main memory. The deletion can be attained by deleting data in small information amount from the data stored in the main memory. For example, in a case where knowledge representation to be found is a multivalue function, the above error margin is utilized to delete one or plural points with comparatively large error margins from the main memory. Otherwise, in a case where knowledge representation to be found is a real number function, the above value V'(x) is calculated, and deletion is performed from data with small V'(x) value.

Hereinbelow, an embodiment of the present invention will be described with reference to the drawings. FIG. 1 illustrates the construction of program 100 in accordance with a knowledge finding method of the present embodiment. The program 100 comprises an input unit 107 which inputs a lower-order learning algorithm and data as training data for the algorithm to perform learning, a precision enhancement unit 103, a prediction unit 102 which predicts a label value of unknown-labeled data inputted into the input unit 107, an output unit 101 which outputs the label value predicted by the prediction unit 102, and a control unit 106 which controls repetitive processing by the precision enhancement unit 103.

Next, the respective units in FIG. 1 will be described. The precision enhancement unit 103 has learning means 104 for causing the lower-order learning algorithm to perform learning on plural partial samples generated by resampling from data stored in the high-speed main memory 120 so as to obtain plural hypotheses, and data selection means 105 for estimating information amounts of respective candidate data read from a large-capacity storage device 130 by using the plural hypotheses obtained by the learning means 104, and additionally storing only data in large information amounts into the high-speed main memory 120. The large-capacity data storage device 130, the high-speed main memory 120 and a CPU (Central Processing Unit) 110 are elements constructing a calculating machine to perform the program 100.

Next, the other operation of the precision enhancement unit 103 will be described. The precision enhancement unit 103 has learning means 104 for causing the lower-order learning algorithm to perform learning on data stored in the high-speed main memory 120 and store plural hypotheses obtained by the learning into the main memory 120 or the large-capacity data storage device 130, and data selection means 105 for estimating information amounts of the respective candidate data read from the large-capacity storage device 130 by using the plural hypotheses obtained by the past learning, and additionally storing only data in large information amounts into the high-speed main memory 120.

Figure 2:
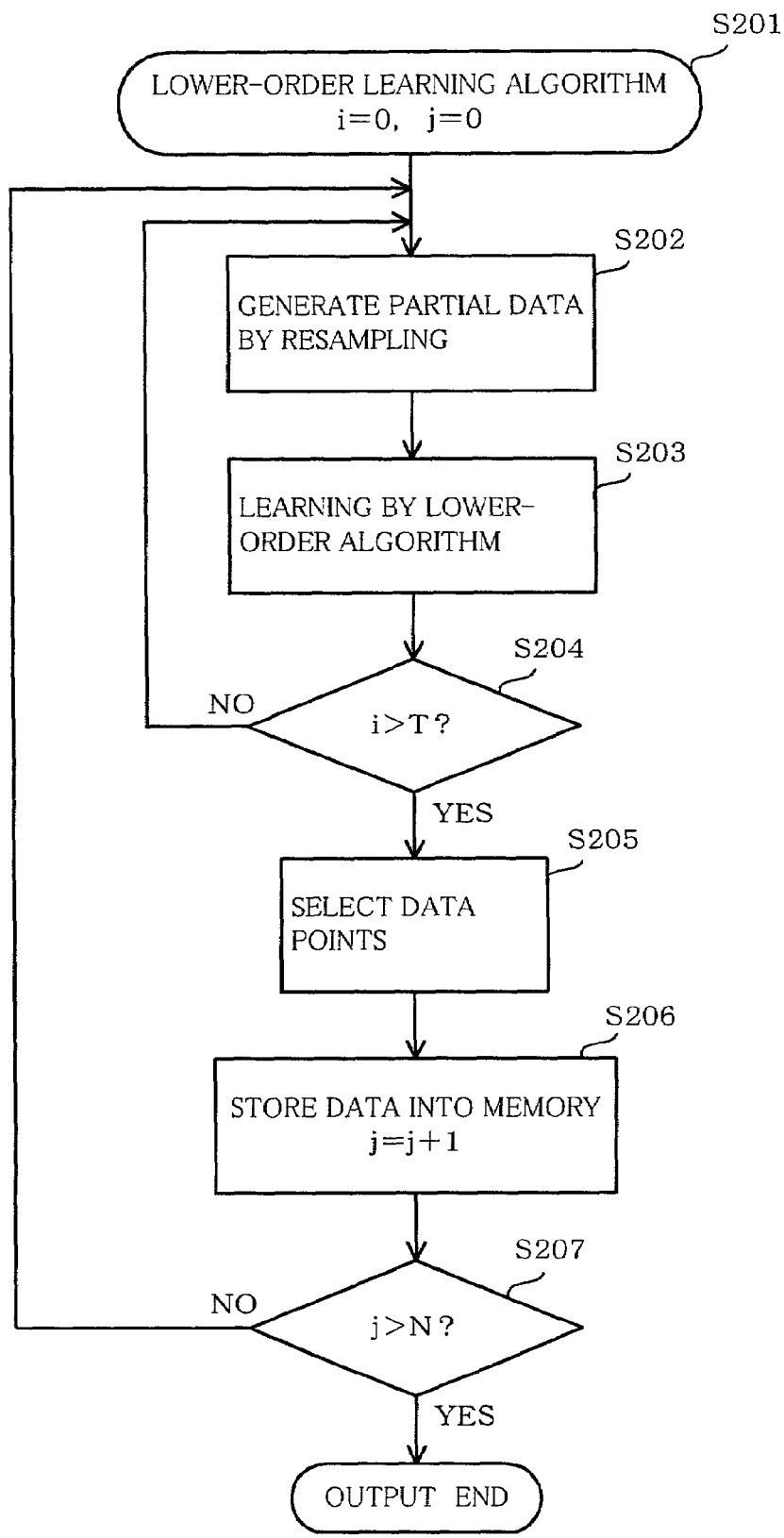
FIG. 2 is a flowchart showing the flow of the operation of the embodiment.

Next, the operation of the knowledge finding method having the above structure will be described with reference to the drawings. FIG. 2 is a flowchart showing the flow of operation according to the embodiment of the present invention.

First, the lower-order learning algorithm such as an algorithm to learn a decision tree is inputted into the input unit 107 (step S201). Next, at step S202, the learning means 104 generates a partial data set by resampling from the data stored in the high-speed main memory 120. The partial data set is inputted via the input unit 107, and the lower-order learning algorithm performs learning on the input data set, and hypotheses are obtained (step S203).

Next, the number i of resamplings is compared with the number T of resamplings as a stoppage condition. If the number i of resamplings is not over the predetermined number T (NO at step S204), the process returns to step S202, to repeat the above processing. If the number i of resamplings is over the predetermined number T (YES at step S204), the data selection means 105 uses the finally-obtained hypotheses to estimate information amounts of candidate data read from the large-capacity data storage device 130, and select data in large information amounts (step S205). The data selected by the data selection means 105 are stored into the high-speed main memory 120, and the data is added to the already-stored data (step S206).

Next, at step S207, the number j of stages is compared with the number N of stages as a stoppage condition. If the number j of stages is not over the predetermined number N (NO at step S207), the processing is repeated from step S202. If the number j of stages is over the predetermined number N (YES at step S207), the knowledge finding process is ended, and the obtained rules are outputted as final hypotheses.

Figure 3:
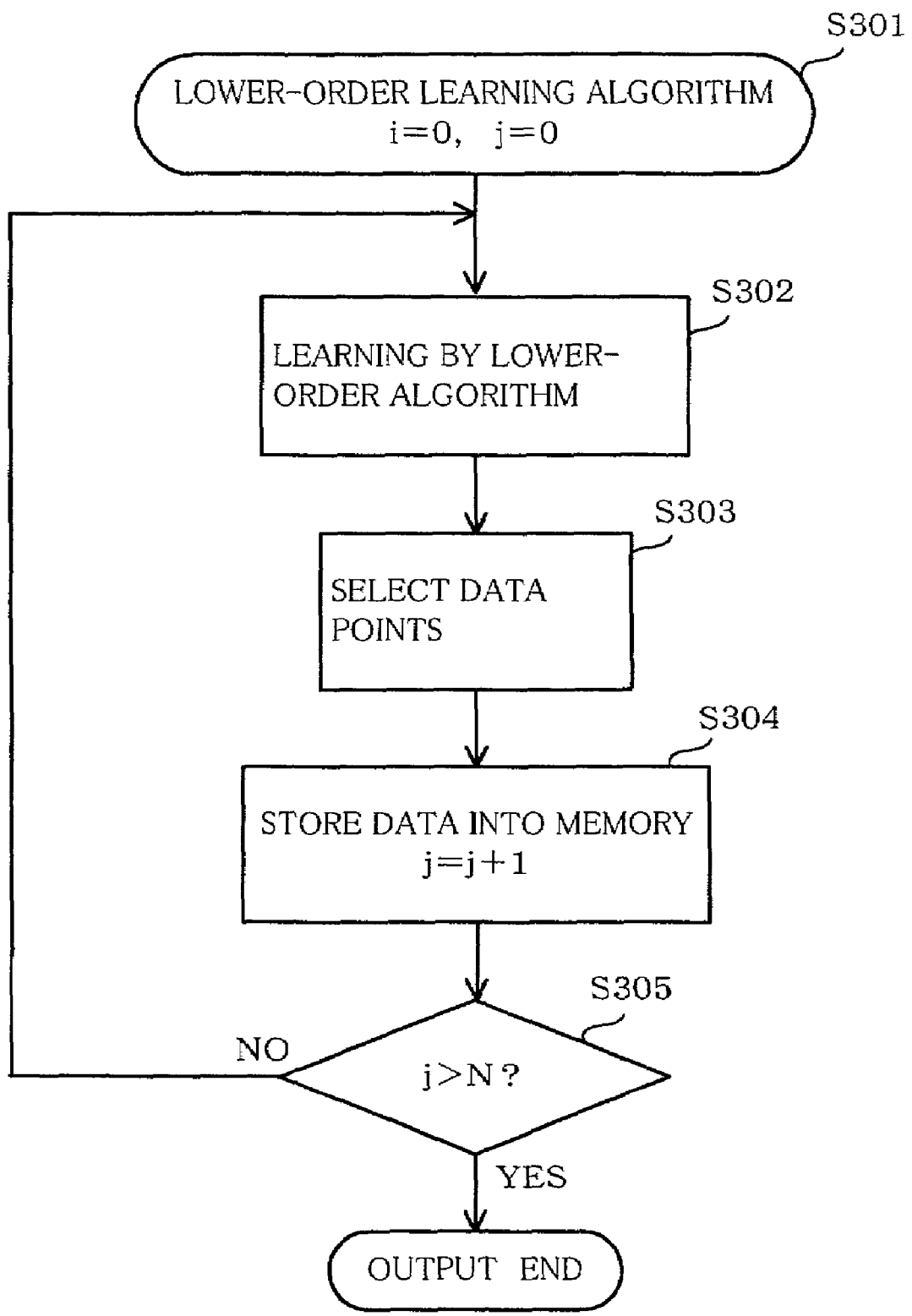
FIG. 3 is a flowchart showing the flow of the operation of the embodiment.

FIG. 3 is a flowchart similar to FIG. 2 showing the flow of operation according to the embodiment of the present invention. In FIG. 3, first, the lower-order learning algorithm is inputted into the input unit 107 (step S301). Next, learning data which is currently stored in the main memory is inputted, and the lower-order learning algorithm performs learning on the data. Then hypotheses obtained by the learning are inputted into the main memory 120 or the large-capacity data storage device 130 (step S302). Next, the data selection means 105 uses hypotheses obtained in the past to estimate information amounts of candidate data read from the large-capacity data storage device 130, select data in large information amounts (step S303), and stores the selected data into the main memory (step S304). Finally, at step S305, the number j of stages is compared with the number N of stages as the stoppage condition. If the number j of stages is not over the predetermined number N (NO at step S305), the processing is repeated from step S302. If the number j of stages is over the predetermined number N (YES at step S305), the knowledge finding process is ended. The obtained rules are outputted as final hypotheses.

As described above, the knowledge finding method of the present invention obtains rules for efficiently predicting a label of unknown data with high precision, from a comparatively small amount of data obtained by selectively sampling data in large information amounts from voluminous data stored in a large-capacity data storage device such as a disk, thus improving effectiveness of data mining. Further, as knowledge finding is performed by reading a small amount of data by selective resampling into a main memory, data mining can be performed by even a calculating machine with a limited main memory.

The present invention is not limited to the above embodiment and various changes and modifications can be made within the spirit and scope of the present invention. Therefore, to appraise the public of the scope of the present invention, the following claims are made.

What is claimed is:

1. A data mining system with a CPU for finding knowledge by using a lower-order learning algorithm for performing learning on a data set to obtain hypotheses, wherein the data set comprises label values indicating classification results and sets of attribute values indicating keys for classification, and for predicting a label value for one datum within said data set by using said hypotheses, and a higher-order algorithm for finding knowledge by means of selective sampling repeatedly reading a part of data selected from a database stored in a large-capacity data storage device into a main memory and performing learning again by using said lower-order learning algorithm, the data mining system comprising:

input means for inputting said lower-order learning algorithm and data on which said lower-order learning algorithm performs learning;

learning means for inputting a plurality of partial data sets, generated by sampling from data stored in said main memory, as training data to said lower-order learning algorithm, and causing said lower-order learning algorithm to perform learning on said data so as to obtain plural hypotheses;

data selection means for predicting label values for a plurality of sample candidate points read from said large-capacity data storage device by using said hypotheses obtained by said lower-order learning algorithm and said learning means, estimating information amounts of the sample candidate points based on obtained predicted values, selecting one or more sample candidate points in large information amounts, and additionally storing the selected candidate points into said main memory;

control means for repeating processing for obtaining a plurality of hypotheses and corresponding data in said main memory by using said learning means and said data selection means until a predetermined stoppage condition is satisfied, and storing a plurality of resulted hypotheses as final hypotheses into said main memory; and prediction means for predicting a label value of unknown-labeled data based on an average or weighted average among said plurality of hypotheses.

2. The data mining system according to claim 1, wherein said data selection means predicts the label values for said sample candidate points by using said pluralality of hypotheses obtained by said learning means, estimates information amounts of said sample candidate points by distribution values of obtained predicted values, selects one or more sample candidate points with large distribution values, and additionally stores the selected candidate points into said main memory.

3. The data mining system according to claim 1, wherein said data selection means calculates weights of respective hypotheses obtained by said learning means as functions of predicted errors of the hypotheses for said training data, then, upon data selection, in case of multivalue prediction, calculates total sums of the weights of said hypotheses to obtain predicted values, with respect to the respective sample candidate points, obtains a margin as a difference between the total sum of the greatest weight and that of the next greatest weight, and selects one or more sample candidate points with small margins, otherwise, in case of real number prediction, selects one or more sample candidate points with large weighted distribution values of the predicted values by said hypotheses, and additionally stores the selected sample candidate points into said main memory, and wherein said prediction means performs prediction by the final hypotheses, with the weighted average among said hypotheses.

4. The data mining system according to claim 1, wherein said data selection means utilizes true labels of data candidate points included in data read from said large-capacity data storage device to calculate an error margin by using predicted errors of said hypotheses and select one or more sample candidate points with small error margins, in case of multivalue prediction, or to select one or more sample candidate points with predicted values having large weighted predicted errors, in case of real number prediction, and additionally stores the selected sample candidate points into said main memory.

5. The data mining system according to claim according to claim 1 or 2, wherein when said data selection means selects said sample candidate points and stores them into said main memory, said data selection means obtains predicted values of label values for data already stored in said main memory by using said hypotheses, selects one or more sample candidate points with predicted values having small distribution and deletes the selected sample candidate points from the data stored in said main memory.

6. The data mining system according to claim 1 or 3, wherein when said data selection means selects said sample candidate points and stores them into said main memory, said data selection means obtains predicted values of label values for data already stored in said main memory by using said hypotheses, then in case of multivalue prediction, selects one or more sample candidate points with large margins of predicted values, or in case of real number value prediction, selects one or more sample candidate points with predicted values having small weighted distribution values, and deletes the selected sample candidate points from the data stored in said main memory.

7. The data mining system according to claim 1 or 4, wherein when said data selection means selects said sample candidate points and stores them into said main memory, said data selection means obtains predicted values of labels for the data already stored in said main memory by using said hypotheses, then in case of multivalue prediction, selects one or more sample candidate points with predicted values having large error margins, or in case of real number value prediction, selects one or more sample candidate points with predicted values having small weighted predicted errors, and deletes the selected sample candidate points from the data stored in said main memory.

8. A data mining system with a CPU for finding knowledge by using a lower-order learning algorithm for performing learning on an input data set to obtain hypotheses and for predicting a label value for one datum within said data set by using said hypotheses, and a higher-order algorithm for finding knowledge by means of selective sampling repeatedly reading a part of data selected from a database stored in large-capacity data storage device into a main memory and performing learning again by using said lower-order learning algorithm, the data mining system comprising:

input means for inputting said lower-order learning algorithm and data on which said lower-order learning algorithm performs learning;

learning means for inputting data stored in said main memory as training data to said lower-order learning algorithm and performing learning on the data, and storing a plurality of hypotheses obtained by the learning into said large-capacity data storage device or said main memory;

data selection means for predicting label values for a plurality of sample candidate points read from said large-capacity data storage device by using the plurality of hypotheses obtained by said lower-order learning algorithm and said learning means, estimating information amounts of the sample candidate points based on obtained predicted values, selecting one or more sample candidate points in large information amounts, and additionally storing the selected sample candidate points into said main memory;

control means for repeating processing of obtaining a plurality of hypotheses and corresponding data in said main memory by using said learning means and said data selection means until a predetermined stoppage condition is satisfied, and storing a plurality of resulted hypotheses as final hypotheses into said main memory or said large-capacity data storage device; and prediction means for predicting a label value of unknown-labeled data based on an average or weighted average among said hypotheses.

9. The data mining system according to claim 8, wherein said data selection means predicts the label values for said sample candidate points by using said hypotheses obtained by said learning means, estimates information amounts of said sample candidate points by distribution values of obtained predicted values; selects one or more sample candidate points with large distribution values, and stores the selected sample candidate points into said main memory.

10. The data mining system according to claim 8, wherein said data selection means calculates weights of the respective hypotheses obtained by said learning means as functions of predicted errors of the hypotheses for said training data, then, upon data selection, in case of multivalue prediction, calculates total sums of the weights of said hypotheses to obtain predicted values, with respect to the respective sample candidate points, obtains a margin as a difference between the total sum of the greatest weight and that of the next greatest weight, and selects one or more sample candidate points with small margins, otherwise, in case of real number prediction, selects one or more sample candidate points with large weighted distribution values of the predicted values by said hypotheses, and stores the selected sample candidate points into said main memory, and wherein said prediction means performs prediction by the final hypotheses, with the weighted average among said hypotheses.

11. The data mining system according to claim 8, wherein said data selection means utilizes true labels of sample candidate points included in data read from said large-capacity data storage device to calculate an error margin by using predicted errors of said hypotheses and select one or sample candidate points with small error margins, in case of multivalue prediction, or to select one or more sample candidate points with predicted values having large weighted predicted errors, in case of real number prediction, and stores the selected sample candidate points into said main memory.

12. A data mining system with a CPU for finding knowledge by using a lower-order learning algorithm for performing learning on an input data set to obtain hypotheses and for predicting a label value for one datum within said data set by using said hypotheses, and a higher-order algorithm for finding knowledge by means of selective sampling repeatedly reading a part of data selected from a database stored in large-capacity data storage device into a main memory and performing learning again by using said lower-order learning algorithm, the data mining system comprising:

input means for inputting said lower-order learning algorithm and data on which said lower-order learning algorithm performs learning;

learning means for inputting a plurality of partial data sets, generated by re-sampling from data stored in said main memory, as training data to said lower-order learning algorithm, and causing said lower-order learning algorithm to perform learning on said data so as to obtain a plurality of hypotheses;

data selection means for predicting label values for a plurality of sample candidate points read from said large-capacity data storage device by using a plurality of hypotheses previously obtained by said lower-order learning algorithm and said learning means, estimating information amounts of the sample candidate points based on obtained predicted values, selecting a plurality of sample candidate points in large information amounts, and storing the selected sample candidate points into said main memory;

control means for repeating processing for obtaining a plurality of hypotheses and corrersponding data in said main memory by using said learning means and said data selection means until a predetermined stoppage condition is satisfied, and storing a plurality of resulted hypotheses as final hypotheses into said main memory or said large-capacity data storage device; and prediction means for predicting a label value of unknown-labeled data based on an average or weighted average among said hypotheses.

13. The data mining system according to claim 12, wherein said data selection means predicts the label values for said sample candidate points by using said hypotheses obtained by said learning means, estimates information amounts of said sample candidate points by distribution values of obtained predicted values, selects one or more sample candidate points with large distribution values, and stores the selected sample candidate points into said main memory.

14. The data mining system according to claim 12, wherein said data selection means calculates weights of the respective hypotheses obtained by said learning means as functions of predicted errors of the hypotheses for said training data obtained by said learning means, then, upon data selection, in case of multivalue prediction, calculates total sums of the weights of said hypotheses to obtain predicted values, with respect to the respective candidate points, obtains a margin as a difference between the total sum of the greatest weight and that of the next greatest weight, and selects one or more sample candidate points with small margins, otherwise, in case of real number prediction, selects one or more sample candidate points with large weighted distribution values of the predicted values by said hypotheses, and stores the selected sample candidate points into said main memory, and wherein said prediction means performs prediction by the final hypotheses, with the weighted average among said hypotheses.

15. The data mining system according to claim 12, wherein said data selection means utilizes true labels of sample candidate points included in data read from said large-capacity data storage device, to calculate an error margin by using predicted errors of said hypotheses and select one or more sample candidate points with small error margins, in case of multivalue prediction, or to select one or more sample candidate points with predicted values having large weighted predicted errors, in case of real number prediction, and stores the selected sample candidate points into said main memory.

* * * * *